Figure 1:
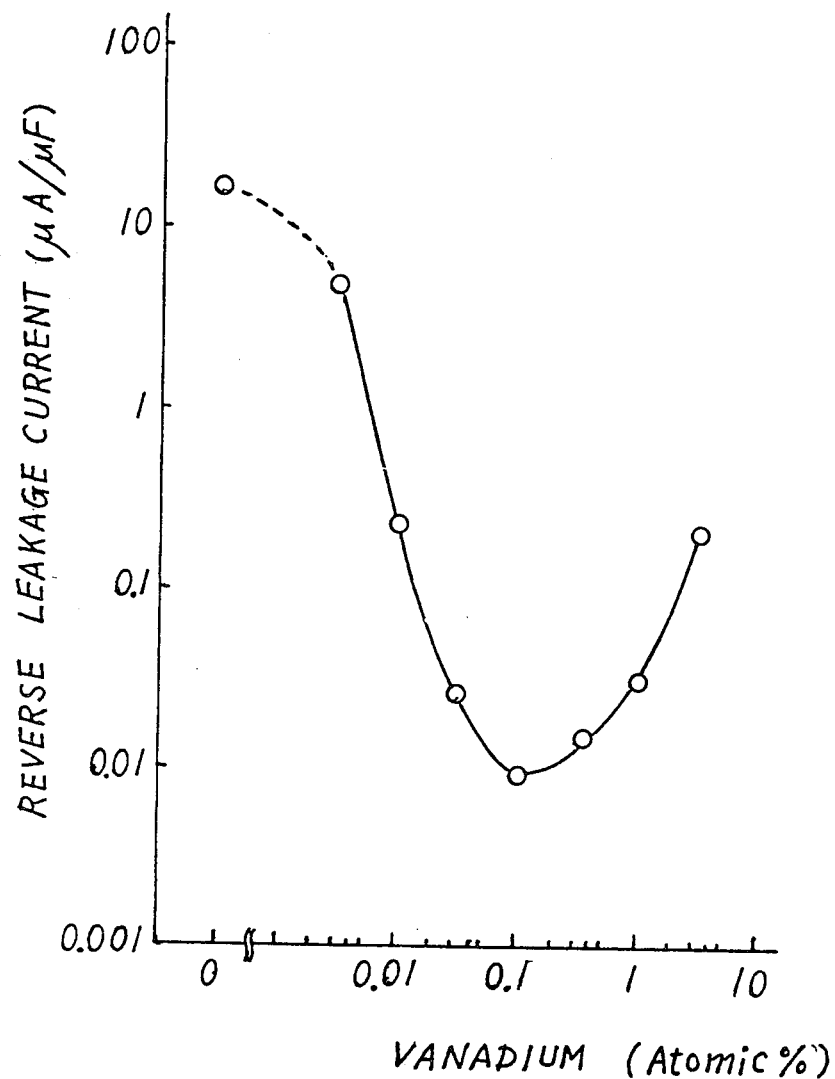

United States Patent [19]

Nakata et al.

[11] 4,277,543

[45] Jul. 7, 1981

[54] ANODE FOR SOLID ELECTROLYTIC CAPACITOR AND METHOD FOR MAKING THE SAME

[75] Inventors: Koreaki Nakata, Takarazuka; Masahiro Oita, Kashiwara; Hyogo Hirohata, Neyagawa, all of Japan

[73] Assignee: Matsushita Electric Industrial Co., Ltd., Japan

[21] Appl. No.: 97,721

[22] Filed: Nov. 26, 1979

[30] Foreign Application Priority Data

Nov. 25, 1978 [JP] Japan ................................. 53/145483
Apr. 10, 1979 [JP] Japan ................................. 54/44068

[51] Int. Cl.$^3$ ............................ B22F 3/00; B22F 5/00
[52] U.S. Cl. ...................................... 428/546; 75/212; 75/222; 361/305; 252/513; 428/566; 428/570
[58] Field of Search .................. 75/212, 222; 361/305; 252/513; 428/546, 566, 570

[56] References Cited

U.S. PATENT DOCUMENTS

| | | | |
|---|---|---|---|
| 3,004,332 | 10/1961 | Werner ................................ | 75/212 |
| 3,260,576 | 7/1966 | Gruene et al. ........................ | 75/212 |
| 3,320,500 | 5/1967 | Axelrod et al. ...................... | 252/513 |
| 3,984,208 | 10/1976 | Moulin et al. ....................... | 75/222 |
| 3,988,651 | 10/1976 | Hertz .................................... | 361/305 |

*Primary Examiner*—Brooks H. Hunt
*Attorney, Agent, or Firm*—Wenderoth, Lind & Ponack

[57] ABSTRACT

An anode comprising a porous sintered body made of tantalum powder each particle of which having a layer of at least one of V, Mo and Pd. This anode permits a solid electrolytic capacitor to have a low reverse current and a low leakage current. This invention also provides an effective method for preparing such anode.

8 Claims, 2 Drawing Figures

ANODE FOR SOLID ELECTROLYTIC CAPACITOR AND METHOD FOR MAKING THE SAME

This invention relates to an anode for an electrolytic capacitor and a method for making the same.

A tantalum solid electrolytic capacitor, as is well known, consists essentially of a tantalum anode, a dielectric oxide film formed thereon by anodic oxidation, a semiconductive oxide layer such as manganese oxide as a counter electrode coated on the oxide film, a graphite layer on the semiconductive oxide layer and a metallic conductive layer on the graphite layer.

Electrolytic capacitors differ from other kinds of capacitors such as a ceramic capacitor and a film capacitor in view e.g. of the polarity of the electrode terminal. When a positive voltage is applied to the anode of an electrolytic capacitor, leakage current (forward leakage current) is found to be very much lower than in the case of reverse application. The very large reverse current is likely to lead to breaking-down of the dielectric film of the capacitor. Usage of an electrolytic capacitor, therefore, is limited as to the electronic circuits in which a reverse voltage occurs or can occur.

In order to improve the characteristics of tantalum-anode capacitors determined by the anodic oxide film on the anode, the addition of suitable additive metals to the tantalum anode has been studied and employed. U.S. Pat. No. 3,320,500 discloses a thin film capacitor improved in its reverse voltage break down and made of an alloyed tantalum film formed by the co-sputtering technique, in which a sputtering target is combination of tantalum and another metal. U.S. Pat. No. 3,984,208 discloses a solid electrolytic capacitor improved in its capacitance-temperature characteristics and consisting essentially of an anode made from a mixture of tantalum and another metal.

The co-sputtering technique can form a homogeneous tantalum alloy with more metals, but is not a suitable method for making a powder for a sintered capacitor anode at a low cost. The method for making a porous sintered body by sintering a mixture of tantalum and another metal cannot form a homogeneous alloy.

An object of the present invention is to provide a sintered anode for a solid electrolytic capacitor characterized by a lower reverse current and a lower or at least not a higher forward leakage current than those of a pure tantalum capacitor.

Another object of the present invention is to provide a method for making an anode for a solid electrolytic capacitor characterized by a lower reverse current and a lower or at least not a higher forward leakage current than those of a pure tantalum capacitor.

Figure 2:
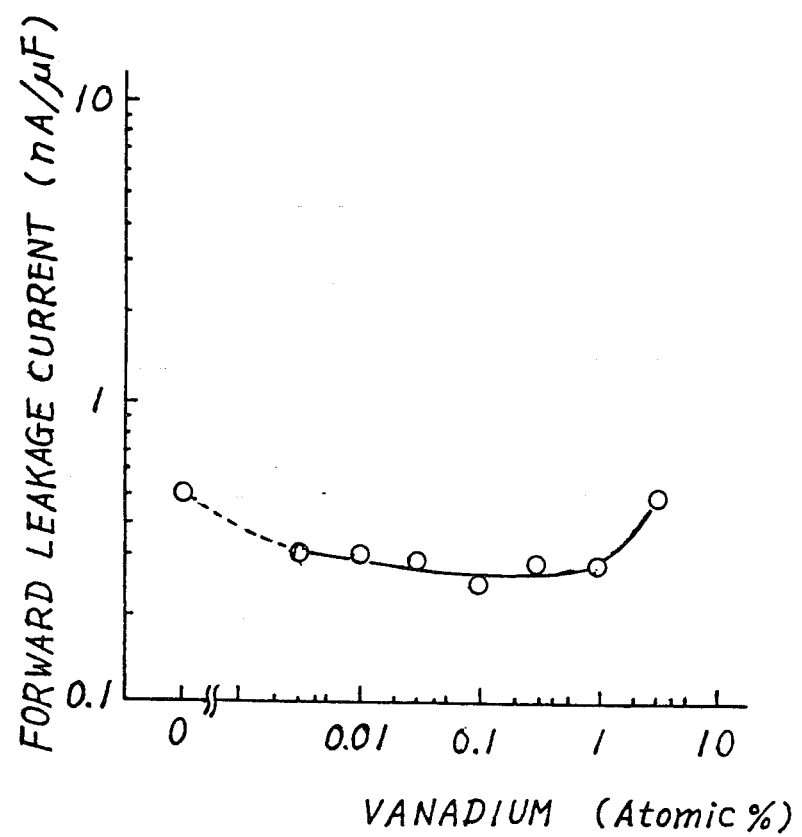

Features and advantages according to the present invention will be apparent from consideration of the following detailed description taken in conjunction with the accompanying drawings, in which:

FIG. 1 shows a reverse leakage current of a solid electrolytic capacitor made of an anode according to the present invention as function of quantity of vanadium additive; and FIG. 2 shows a forward leakage current of a solid electrolytic capacitor made of an anode according to the present invention.

According to the present invention, an anode for an electrolytic capacitor characterized by a lower reverse leakage current and a lower or at least not higher forward leakage current than those of a pure tantalum capacitor is provided by coating a tantalum anode with at least one metal selected from the group consisting of vanadium, molybdenum and palladium.

According to the invention, a preferable quantity range of the additive metal selected from the group V, Mo and Pd is 0.003 to 3 atomic percent of the anode. Too small an amount of the additives does not cause improved characteristics in the reverse leakage current. Too large an amount causes degradation in the forward leakage current. A preferable particle size of the tantalum powder is smaller than 100 mesh.

A sputtering technique is preferable for coating a tantalum powder with the additive metal layer. In order to obtain a homogenous additive metal layer, stirring or agitating the tantalum powder is desired for the sputtering operation. A tantalum wire, a tantalum wire coated with the additive metal layer, or a tantalum-additive metal alloy wire can be used as an anode lead wire to be embedded in a pressed body. A sintered porous body is formed by sintering a pressed body of additive-coated tantalum powder of a suitable shape in a vacuum or inert atmosphere at an elevated temperature.

An embodiment of the present invention will be described below.

30 grams of a tantalum powder was spread in a vessel similar to a shallow disk which was placed below a vanadium sputtering target having a diameter of 10 cm. Sputtering was performed at an input hf power of 150 W in 0.05 mmHg of argon. The tantalum powder was stirred by a rotating stirrer similar to a comb or a hayfork. The amount of vanadium coated on the tantalum powder is proportional to sputtering time.

By varying the sputtering time, various vanadium-coated tantalum powders, each of 160 mg, were obtained. Each powder was pressed to form a cylindrical body with a tantalum wire embedded therein. Each pressed body was sintered in a vacuum less that $2 \times 10^{-5}$ mmHg at an elevated temperature of 1800° C. for 20 minutes (The sintering atmosphere can be any inert one.) The obtained porous sintered body was formed into a solid electrolytic capacitor by a well known technique as described below.

A sintered body was anodically oxidized in a 1% phosphoric acid solution of 85° C. at 50 V of formation voltage for 2 hours. Manganese dioxide layer was formed on the anodic oxide layer by decomposition of a manganous nitrate solution. The manganese dioxide layer was coated with a colloidal graphite layer and then a silver paint layer on the graphite layer.

FIGS. 1 and 2 show reverse leakage current at a reverse voltage of 4 V (which corresponds to forward voltage of −4 V) after 0.5 minute after voltage application, and forward leakage current at a forward voltage of 10 V 3 minutes after voltage application as a function of the quantity of vanadium additive, respectively. The reverse or forward leakage current in the Figures is expressed by the value ($\mu A/\mu F$ or $nA/\mu F$) defined by leakage current per capacitance of the capacitor.

FIGS. 1 and 2 show an improvement in reverse leakage current over a range of vanadium addition of 0.003 to 3 atomic percent without deteriorating forward leakage current in this range as compared with the forward current of a pure tantalum capacitor.

For comparison, a solid electrolytic capacitor consisting essentially of a vanadium additive sintered anode made from a mixture of tantalum powder and a vanadium powder was also made and measured as described below. A mixture of tantalum powder having a particle size smaller than 100 mesh and 0.3 atomic percent of vanadium powder having a particle size smaller than 325 mesh was used for making a sintered anode under the same pressing and sintering conditions as those used in the above embodiment and was finally formed into a solid electrolytic capacitor also under the same conditions as employed above.

The reverse leakage current of the thus made capacitor described above at a reverse voltage of 4 V was about 7 times as high as that of the capacitor having a vanadium content of 0.3 atomic percent according to the above embodiment of the invention. Furthermore, forward leakage current of the capacitor made of the mixture of tantalum and vanadium powder at a forward voltage of 10 V was about 300 times as high as that of the capacitor having a vanadium content of 0.3 atomic percent according to the above embodiment of the invention. Therefore, increase of forward leakage current significantly occurs by addition of vanadium in the case of the powder-mixing method.

Instead of using vanadium in the above embodiment of this invention, each of modybdenum and palladium was used and measured in the same manner as that described above in the embodiment of this invention. Further, various mixtures of two and all of vanadium, molybdenum and palladium were used instead of the single vanadium addition method in the above embodiment of this invention. Those were subjected to the same measurements as those performed above. Thereby, it was found that 0.003 to 3 atomic percent, in total on the basis of the anode, of at least one of vanadium, molybdenum and palladium causes the results desired by this invention, when coated on a tantalum powder.

What is claimed is:

1. An anode for a solid electrolytic capacitor consisting essentially of a porous sintered body made of tantalum powder particles, said particles having a layer of at least one metal selected from the group consisting of V, Mo and Pd thereon.

2. The anode according to claim 1, wherein the amount of said layer is 0.003 to 3 atomic percent on the basis of said anode.

3. The anode according to claim 1, wherein said metal is vanadium.

4. A method for making an anode for a solid electrolytic capacitor, comprising: coating the surface of a tantalum powder with at least one metal selected the group consisting of V, Mo and Pd; pressing the thus coated tantalum powder into a pressed body having a lead wire embedded therein; and sintering said pressed body in a vacuum or inert atmosphere.

5. The method for making an anode according to claim 4, wherein said coating is performed by a sputtering technique.

6. The method for making an anode according to claim 4, wherein the quantity of said metal layer is 0.003 to 3 atomic percent on the basis of said anode.

7. The method for making an anode according to claim 4, wherein said metal is vanadium.

8. The electrolytic capacitor made by the process of claim 4.

* * * * *